United States Patent [19]

Adler et al.

[11] Patent Number: 4,811,284

[45] Date of Patent: Mar. 7, 1989

[54] COMPUTER TERMINAL SYSTEM WITH MEMORY SHARED BETWEEN REMOTE DEVICES

[75] Inventors: David W. Adler, Mt. Tremper, N.Y.; David A. Kirtland, Austin, Tex.; Ronald S. Manka, Woodstock, N.Y.

[73] Assignee: International Business Machines Corporation, Armonk, N.Y.

[21] Appl. No.: 42,553

[22] Filed: Apr. 24, 1987

Related U.S. Application Data

[63] Continuation of Ser. No. 587,735, Mar. 8, 1984, abandoned.

[51] Int. Cl.$^4$ .............................................. G06F 9/00
[52] U.S. Cl. ............................................................ 364/900
[58] Field of Search ............................... 364/200, 900

[56] References Cited

U.S. PATENT DOCUMENTS

| | | | |
|---|---|---|---|
| 3,996,564 | 12/1976 | Kerrigan et al. | 340/172.5 |
| 4,079,448 | 3/1978 | N'Guyen et al. | 364/200 |
| 4,109,311 | 8/1978 | Blum et al. | 364/200 |
| 4,153,931 | 5/1979 | Green et al. | 364/200 |
| 4,271,479 | 6/1981 | Cheselka et al. | 364/900 |
| 4,315,310 | 2/1982 | Bayliss et al. | 364/200 |

OTHER PUBLICATIONS

IBM Technical Disclosure Bulletin, vol. 21, No. 4, Sep. 1978, pp. 1524–1525, "Multiple Concurrent Independent Sessions on a Display Terminal", J. D. O'Reilly.

Primary Examiner—Thomas M. Heckler
Assistant Examiner—John G. Mills
Attorney, Agent, or Firm—Mark S. Walker; Frederick D. Poag

[57] ABSTRACT

In a computer terminal system, a communications buffer is provided in a remote device to receive and transmit data and control information from and to the remote controller via the transmission link connecting the two. The controller owns the buffer and places data at any point in the buffer and places data at any point in the buffer and tells the device to process it. The controller may write the data to another point in the buffer allowing full overlap.

The controller can read data from the buffer or write data to the buffer while the device is processing. The controller is able to manage the use of the device buffer in accordance with the specific environment in which the controller is operating.

3 Claims, 7 Drawing Sheets

A NEGATIVE TRANSITION AT MID-BIT TIME = 1
A POSITIVE     "         "   "    "    " = 0
NO TRANSITION              "   "    "    " = VIOLATION

FIG. 3

PRIOR ART

COMPUTER TERMINAL SYSTEM WITH MEMORY SHARED BETWEEN REMOTE DEVICES

BACKGROUND OF THE INVENTION

1. Field of the Invention

This invention relates to data input-output terminal systems, and more particularly to a system having a device controller to which displays or other I/O devices are connected by a transmission system such as individual coaxial lines to the respective devices.

2. Description of the Prior Art

Display systems are known which include a controller disposed between a local or remote host computer and a cluster of keyboard display terminals. One such system is shown and described in U.S. Pat. No. 4,271,479. In the system described in that patent, a controller including a processor, storage, and a device cluster adapter for connection of the controller to a plurality of keyboard displays via individual coaxial cables is described. Each individual display includes a cathode ray tube refresh buffer memory in which data in the form of coded display characters and display control codes is written by the remote controller. The displays are dependent upon the controller for interpretation of keystroke data and the writing of that data back at the proper place in the refresh memory of the display. The coaxial cables may be, for example, up to 5,000 feet long and although capable of high frequency bit operation, are serial transmission devices. Systems of this kind have been known for a number of years and may include, for example, an IBM 3274 Control Unit and a plurality of IBM 3278 or IBM 3279 Display Stations. Other display terminals are known which include a microprocessor and memory which in addition to providing a coded image of the display screen, includes working space for inbound and outbound traffic. An example is the IBM 8775 Display Terminal. "Intelligent" output terminals, such as the IBM 3287 and 3289 printers, are known which have buffers in half duplex association with the controller and therefore have storage while is logically part of the controller in a limited sense. (IBM is a registered trademark of International Business Machines Corporation).

It has also been known that it would be desirable to enable keyboard display devices to support concurrent independent sessions on the display terminal. One such arrangement is shown and described in the IBM Technical Disclosure Bulletin, Vol. 21, No. 4, September 1978, pp. 1524, 1525. Thus, there has been an impetus for the development of display systems which can handle more complex operations in the display device itself. This has been made more practical by the ever increasing power and decreasing cost of microprocessors suitable for incorporation in such devices. With these developments in the art, there has arisen, then, the occasion of greater volume and variety of traffic over the transmission link in display systems of the controller-remote display device architecture of the general kind shown in the aforesaid U.S. Pat. No. 4,271,479. Accordingly, it has become desirable to provide ways of handling this traffic more efficiently.

SUMMARY OF THE INVENTION

In accordance with one aspect of the invention, a communications buffer is provided in the remote device to receive and transmit data and control information from and to the remote controller via the transmission link connecting the two. Although the buffer is located in the device, it is owned and its use is directed by the control unit for data traversing in both directions. The control unit places data at any point in the buffer and tells the device to process it. Upon completion of the required operation, the device signals the controller. The controller can off-load data, such as data which it has received from the host computer, to the device buffer while the device is processing; that is, the control unit may write the data to another point in the buffer allowing full overlap.

According to another aspect of the invention, if the device wishes to send a message to the controller, the device signals the control unit, and the controller sends commands to the device telling the device where in the device buffer to build the block of data to be transmitted, the maximum amount of data that may be built and then tells the device to start building the data. The device signals the controller when the data block is built in its buffer. Thereafter, the controller can read the data from the buffer or write data to the buffer while the device is processing. The controller is thus able to manage the use of the device buffer in accordance with the specific environment in which the controller is operating.

Thus, there is provided in a display system having a controller and an input/output device, such as a keyboard display, connected thereto by a transmission link, the improvement wherein the device includes an input/output buffer in communication with the transmission link, said buffer comprising storage for blocks of data and command information with respect thereto and logic responsive to said commands to direct the device to process outbound data stored in the buffer by the controller and to store inbound data for later reading, all under direction of the controller. With respect to the instant invention, inbound and outbound data are defined as data to the controller or processor and data from the controller or processor respectively.

Accordingly, it is a primary object of the invention to provide a more efficient distribution of storage capacity within a distributed controller-input/output device system wherein the controller "owns" the input/output buffer of the device while permitting the device to operate on data in its own storage and data created locally in accordance with its own intelligent operation.

Other objects and advantages of the invention will be apparent from the specification as a whole and from the claims appended hereto.

BRIEF DESCRIPTION OF THE DRAWINGS

FIG. 7 is a diagram of the input/output transmission section of a keyboard display device of the kind shown in Fig. 4. FIG. 7 is comprised of FIG. 7.1 representing the left side of the overall figure and FIG. 7.2 representing the right side.

DETAILED DESCRIPTION

Figure 1:
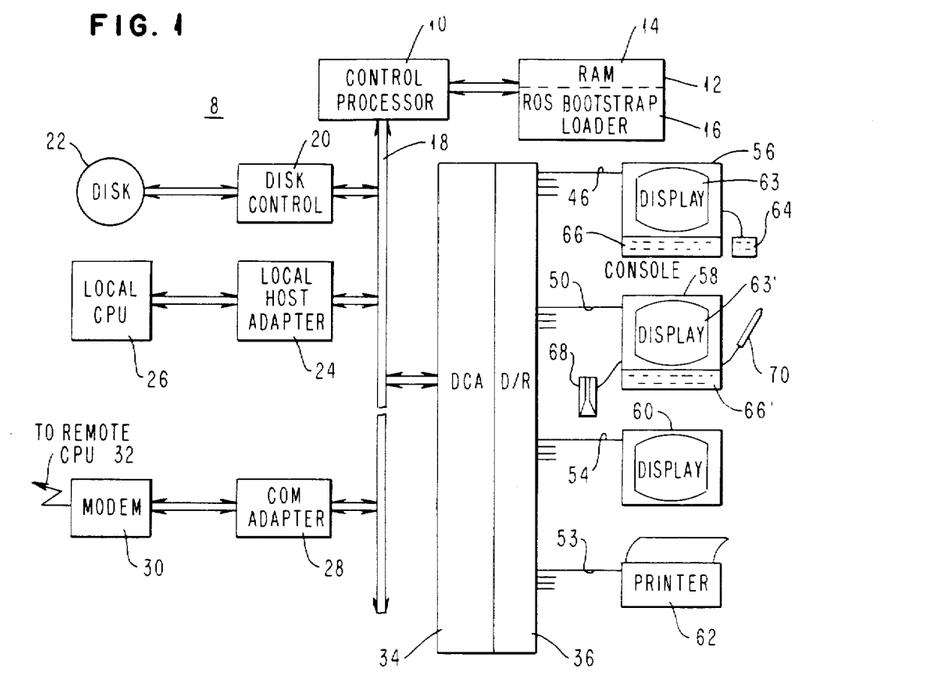
FIG. 1 is a diagram of system including a heat computer, a display controller, and a plurality of display units in which the improved buffer system of the invention can be employed advantageously.

FIG. 1 shows an interactive information handling system configuration including improved input/output apparatus in accordance with the invention. In the illustrated configuration, a CONTROL processor 10 has a natively attached memory 12 including a random addressable read/write storage (RAM) 14 and a read only storage (ROS) 16. The programmed I/O bus 18 of the control processor connects to a disk 22 via bus 18 and processor 10 to working program storage in 14 under the control of bootstrap loaded routines in ROS 16. Bus 18 is shown as a single cable, but may be partitioned into control and data sections in the manner of U.S. Pat. No. 3,996,564. That patent relates to a processor adapter organization broadly suitable for the present system.

Programs so loaded desirably contain not only working instructions for processor 10, but also code conversion tables and the like to be utilized by the system to convert codes from one form to another, as will be described hereinafter. Desirably, disk 22 is removable and is replaceable with other disks so that various program segments and tables can be read from source disks by control 20 into RAM 14 to assemble a program and table configuration appropriate to the employments contemplated for the given system and the characteristics of the various terminal devices to be employed therewith. Also, it is preferred that disk control 20 be capable of both reading from and writing to a disk 22 so that such a program and table configuration, once assembled, can be written onto a disk 22 for use in expedited initialization of the system whenever power is brought back up after a shut down. Thus, although RAM 14 may require rewriting after such a power shut down, loading of the selected program and table material from disk 22 to RAM 14 can be carried out expeditiously. This allows personalization of the system according to the user's needs and reconfiguration thereof by the user whenever desired.

Upstream communication is provided by a local computer adapter 24 to a local computer 26, and/or via a communication line 32 extending to a remote computer. Either the remote computer or the local computer 26 can act as a host providing application program direction to processor 10, as is well known in the art.

For supporting the input/output devices in accordance with the invention, a device control adapter 34 is connected for communication with programmed I/O bus 18 for assembling and controlling the transmission of messages between processor 10 and a driver/receiver module 36 which supports a series of serial transmission links such as coaxial cables or lines 46–54 each providing two-way communication with a respective input, output or input-output device. For this purpose, module 36 contains an individual driver-receiver circuit for each line 46–54, and adapter 34 acts to poll-multiplex among those circuits when in drive (or transmit) mode and to address them individually when in receive mode.

Two keyboard-display stations 56, 58, a display-only station 60 and a printer 62 are shown as representative devices for inclusion in such a system. Station 56 operates as a system console, and like keyboard display station 58, includes a cathode ray tube display 63 and a keyboard 66. The displays and printer 62 serve to output information from the system and the keyboards serve to input information and operator direction to the system. Other information and control inputting devices such as a program function keyboard 64, magnetic stripe card reader 68 and a light pen 70 provide data input and control to the system, in addition to or in lieu of keyboard 66.

A uniform interface between the I/O devices supported by adapter 34 and the system in which they serve is provided for facilitating their attachability to the system in a flexible manner. In the illustrated embodiment, all signals between driver/receiver module 36 and display stations 56, 58 and printers 60 are via the respective coaxial cables 46, 50, 53, 54 in the form of bit words which can be transmitted singly or in groups and can accommodate all commands and data transmissions for these devices.

Figure 2:
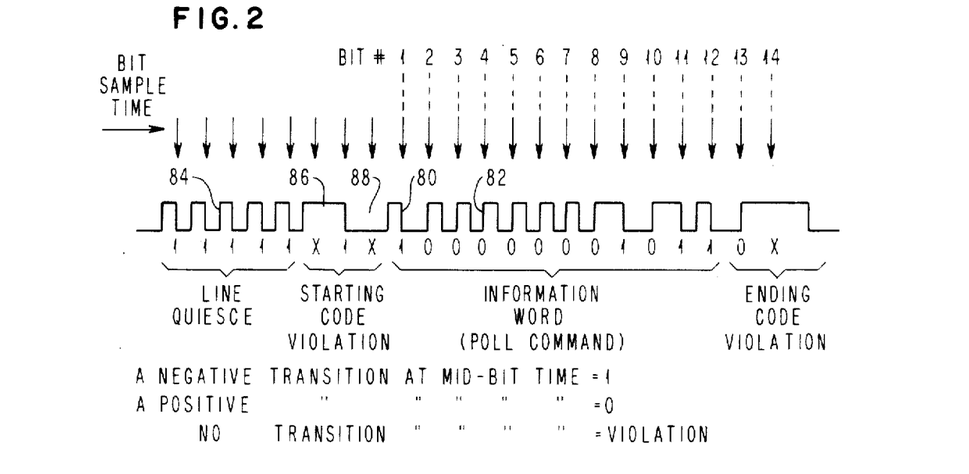
FIG. 2 shows a transmission format and command word layout for a general poll command word from the controller of FIG. 2 to the dislay unit.

FIG. 2 shows a preferred signal configuration for this purpose. As shown in that figure, a transition at mid-bit time signifies a valid bit, a negative going transition such as at 80 signifying a "1" and a positive going transition such as at 82 signifying a "0". Unless chained to a previous word, the data word is preceded by a plurality of line quiescence pulses 84 followed by a code violation recognized by the fact that there is no mid-bit transition during the time shown at 86, 88. Between these code violations there is a transition indicative of a "1" and following this violation period there is another indication of a "1" which constitutes bit #1 time. Mid-bit time 13 signifies the beginning of an ending code violation which can be followed by another word or a return to the line quiescence signal 84.

Figure 3:
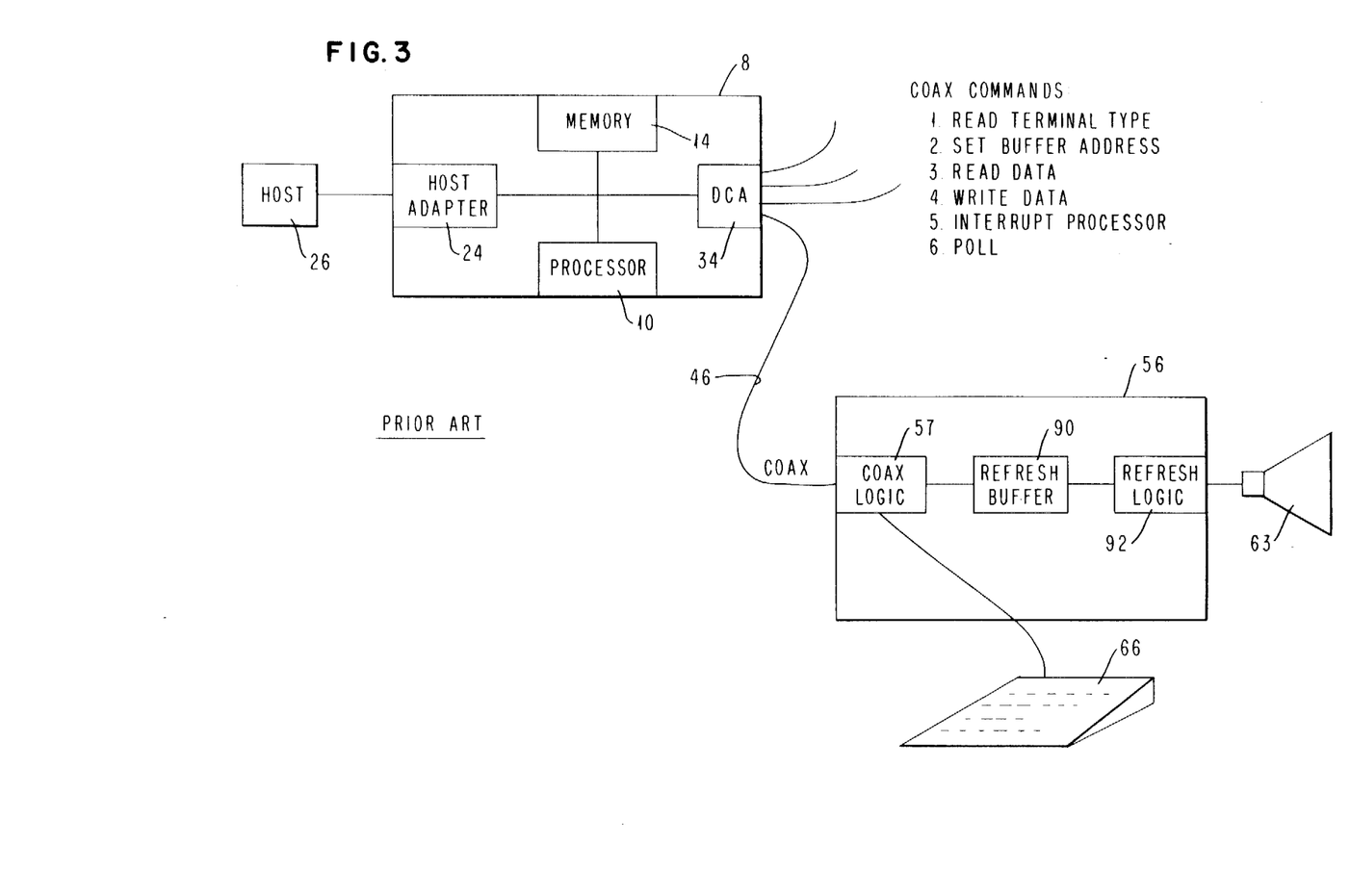
FIG. 3 is a diagrammatic representation of a prior art system of the general kinds of FIG. 1 and FIG. 2 as implemented in systems such as described in the aforesaid U.S. Pat. No. 4,271,479.

FIG. 3 shows, in schematic fashion, the function of the buffer 90 in prior art display terminals of the general kind shown at 56 in FIG. 1. The buffer 90 has primarily a refresh function for supplying coded information repetitively to refresh logic 92 which includes a character generator for converting the coded information into a bit stream corresponding to dots or pels to be shown by a raster on the screen of a cathode ray tube 63. The refresh buffer also contains attribute control codes which characterize fields of information shown on the screen, and attribute codes defining the colors and highlighting of the characters to be displayed. The character generator of the refresh logic 92 can also include read/write storage defining character fonts downloaded from the host 26 for use in the creation of graphics displays on the face of the CRT 63, and character attributes in the refresh buffer 90 in such case with function to point to the font to be used for the associated character.

The aforedescribed classes of information can be loaded into buffer 80 and the font memory in refresh logic 82 by the controller, the source of the information being, for example, the host 26 or inputs made by an operator at the keyboard 66. In such a system the coax logic 57 includes very limited buffering between the coaxial cable 46 and the display device 56. Such input/output buffering may include a serializer/deserializer register sufficient to accommodate one byte of information and associated starting and ending codes such as shown in FIG. 2, and other miscellaneous registers associated with parity checking, etc.

Figure 4:
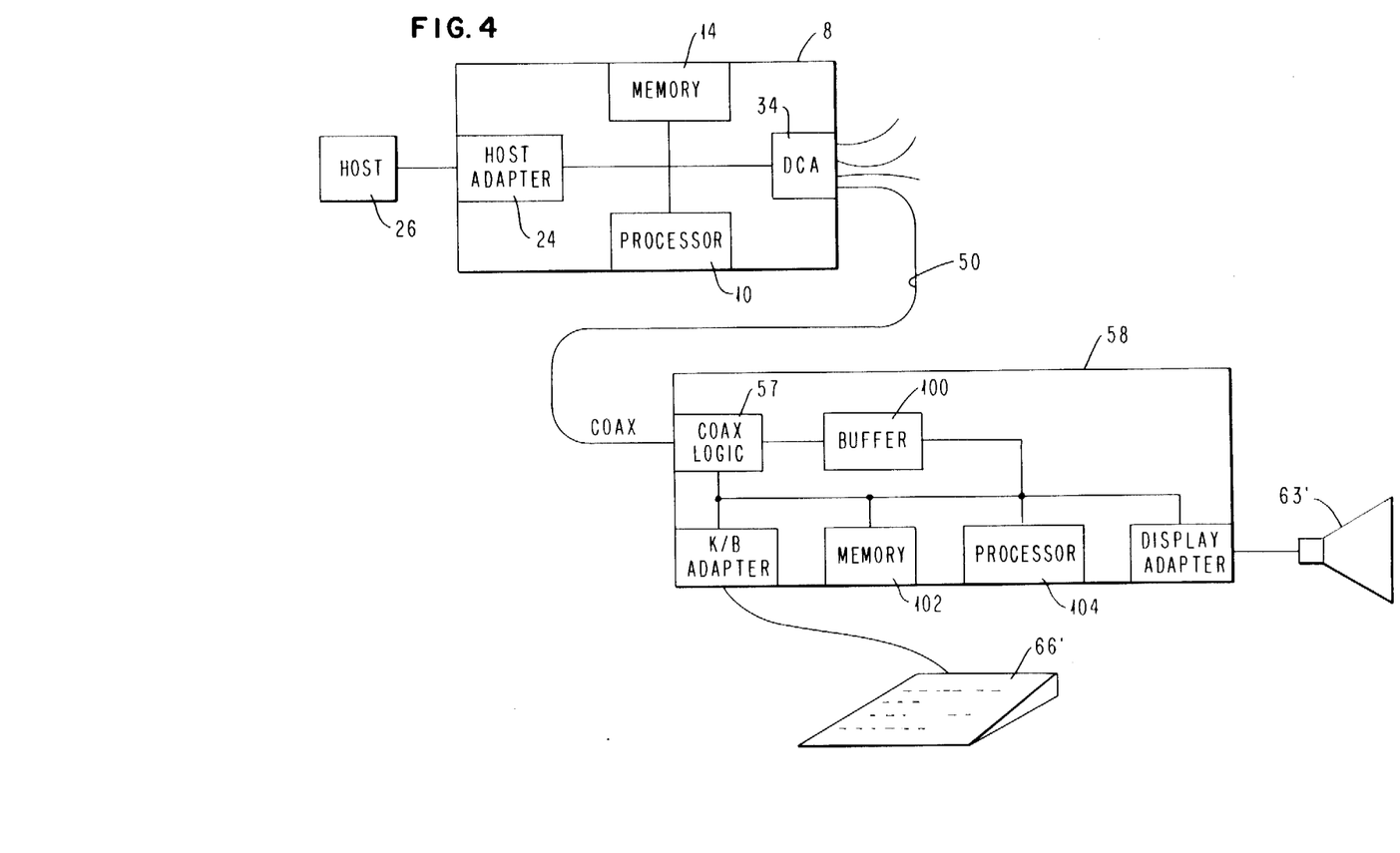
FIG. 4 is a diagrammatic representation of an embodiment of the improvement to such prior art systems afforded by the present invention, whereby the refresh buffer of the prior art is replaced by an input/output buffer dedicated to the operations of the controller and its interface to the display device through the intervening coaxial transmission line.

FIG. 4 shows a system which constitutes an improvement over the prior art system of FIG. 3, in accordance with a major aspect of the present invention. In FIG. 4, the display device 58 (also shown in FIG. 1) includes an input/output buffer 100 which is in communication with and randomly addressable by the controller 8 via coax 50. Although the input/output buffer 100 is physically located in the display device 58 which may be a very considerable distance, for example 5,000 feet, from the controller 8 it is logically part of the controller 8. The device 58 of FIG. 4 includes its own memory 102 for storing data for refresh of the image on the screen of the CRT 63' and a microprocessor 104 for control of the fetching of data from memory 102 for such purposes as well as for the processing of data inputted to the display device by keyboard 66'. In other words, the display device 58 is a so-called "intelligent" display terminal.

Although much of the processing formerly carried out by the controller 8, for example, keystroke handling, can thus be handled locally within the device 58, there is still such traffic to be handled via controller 8 and coax 50 between the host 26 and the device 58. This is particularly so if the device 58 is a multiple logical terminal such as described, for example, in the afore-cited IBM Technical Disclosure Bulletin publication. By providing the buffer 100 which is resident in the device 58 and yet owned, that is, logically part of, the controller 8, data can be passed in blocks over coax 50 more readily in both directions. Moreover, as will become apparent, the placement of the buffer 100 in the device rather than in the controller enables expansion of memory of the system as devices of various kinds with various data needs are added, and maintenance of ownership by the controller 8 of such remotely situated input/output buffers allows the management of the buffer space thus created in accordance with the needs of the controller on a dynamic or at least easily changeable basis according to the needs of the system and the kinds of host interaction therewith required from time to time.

As mentioned above, communication between the device 58 and the controller 8 is provided via the buffer 100. Requests are made by the controller by placing the function request and the necessary parameters in the proper buffer locations and then telling the device microprocessor 104 to execute the operation via a coax command. On write type data transfer operations (outbound messages), the data must reside in the device's buffer before the request execution is initiated. On read type operations (inbound messages), the device places the data in the specified buffer locations as part of processing the request.

The device then performs the requested function and tells the controller when it has completed or terminated. A completion code is posted by the device in a small section of the buffer 100 to indicate whether or not processing is completed normally. The controller then reads the completion code and processes it as required.

The device may also make unsolicited requests to the controller by placing a request code in the buffer 100 and telling the controller (in response to a poll) that the request is present. The controller then reads the request code and processes it when internal contention conditions allow. Processing by the controller consists of acknowledging the request and issuing more function requests as required to service the device. Once the request is acknowledged, the device is free to present another unsolicited request.

Figure 5:
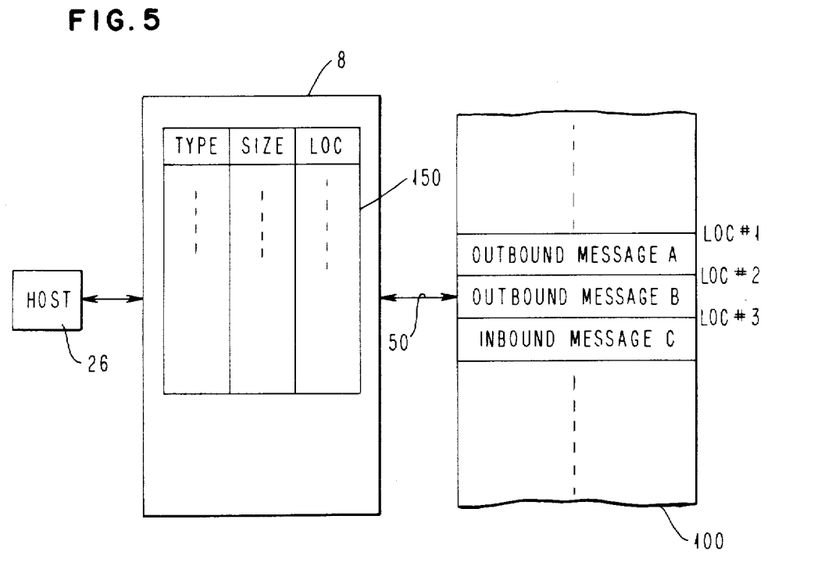
FIG. 5 is a schematic diagram of the relationship of the transmission control buffer of the arrangement of FIG. 4 to the display controller of the system.
Figure 6:
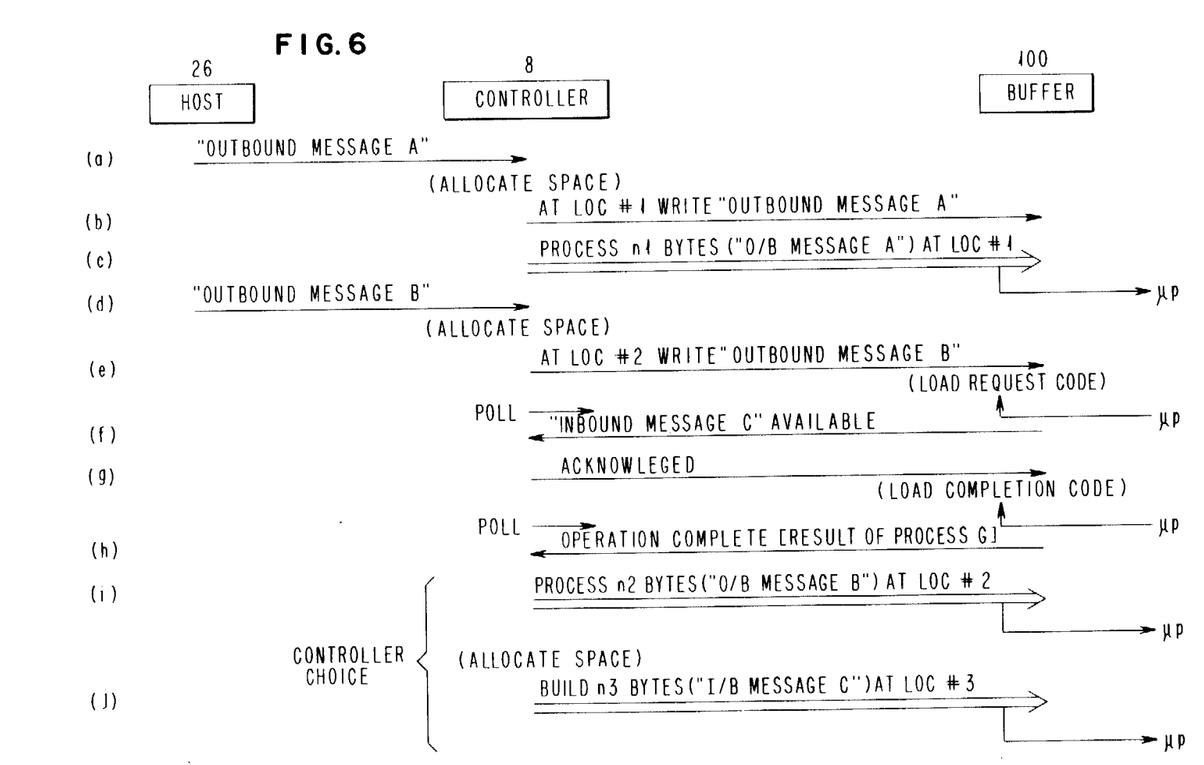
FIG. 6 is a diagrammatic representation of information flow between the host, controller, and keyboard display device in an improved system of the general kind shown in FIG. 1 but as implemented in accordance with FIGS. 4 and 5.
Figure 71:
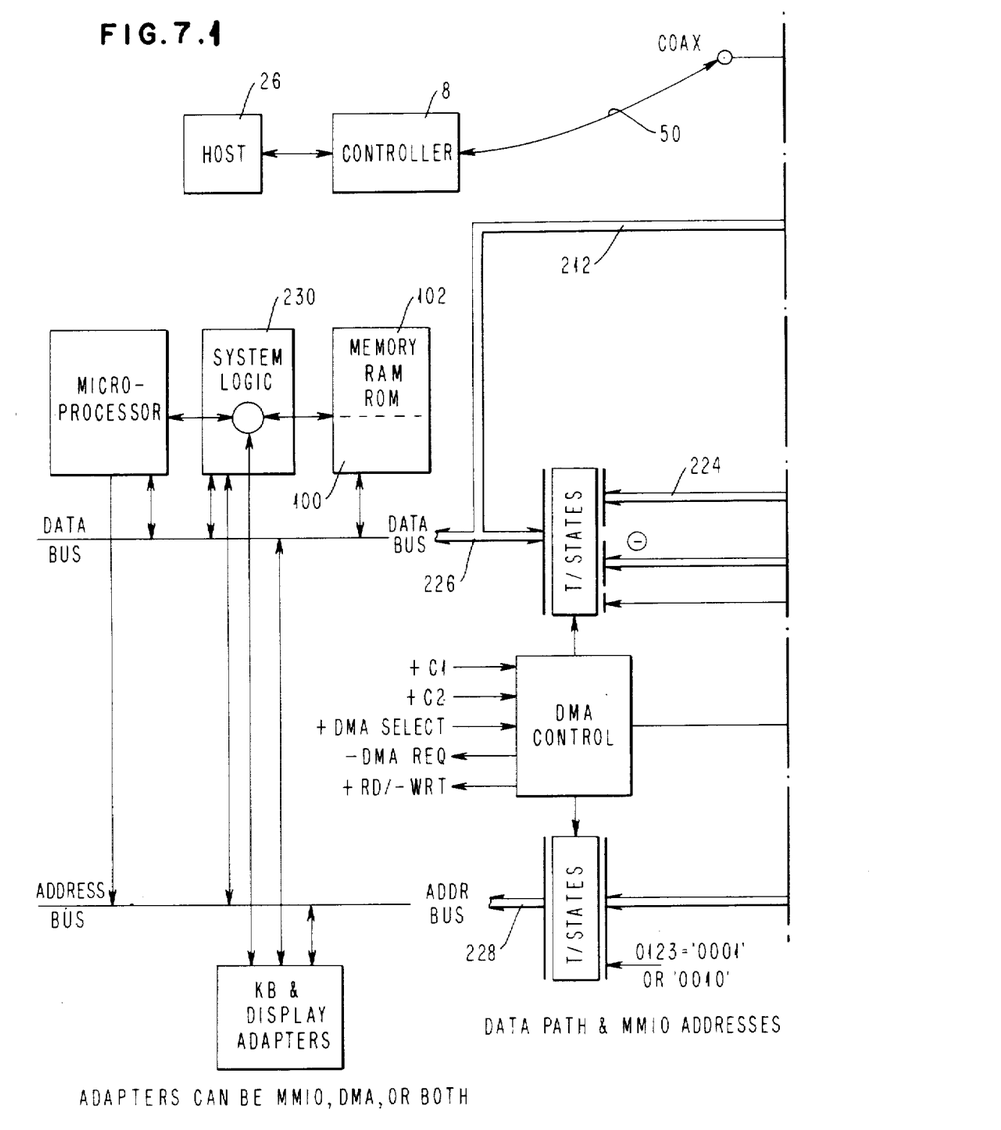
Figure 72:
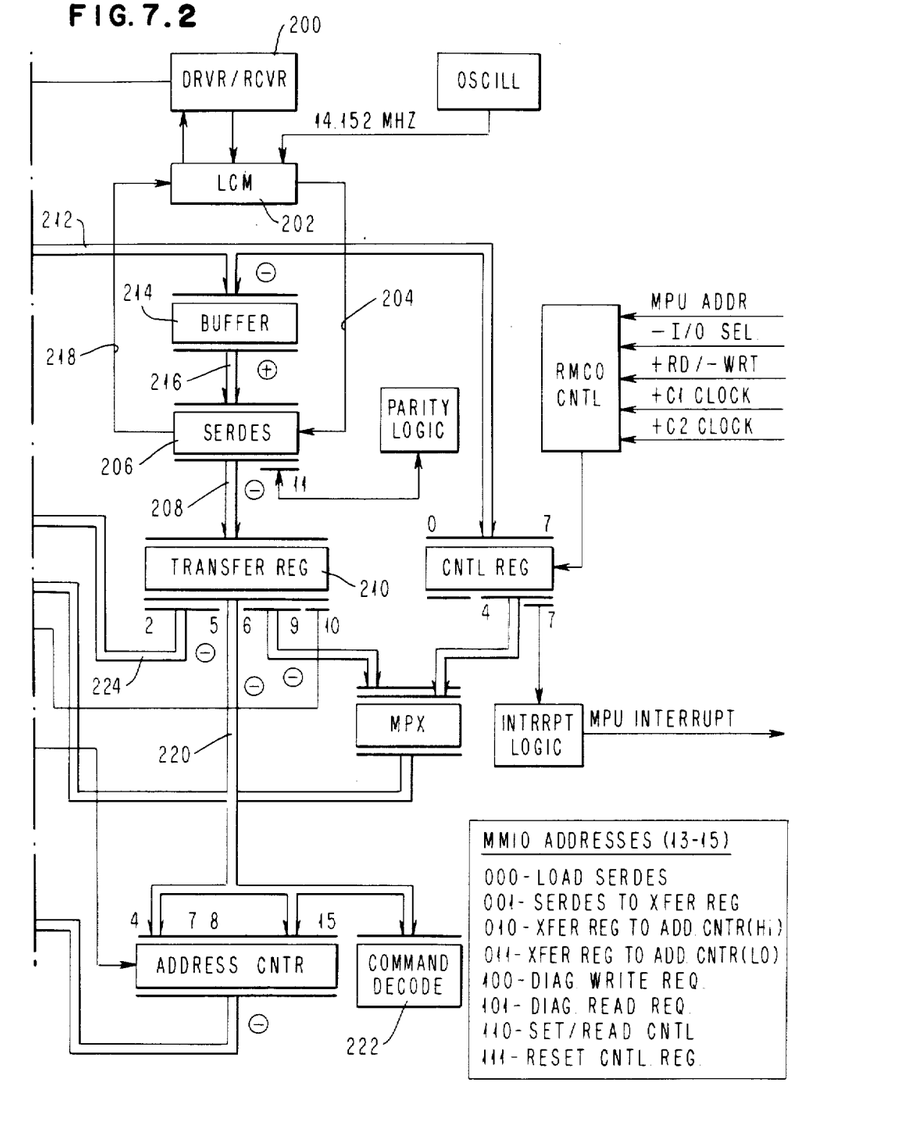

An example of a typical communication session between the host 26 and the device 58 via the controller 8 is illustrated in FIGS. 5 and 6. The controller 8 maintains a table 150 concerning the current state of the buffer 100. In FIG. 5, the heading TYPE in the table 150 may indicate, inter alia:

Inbound data being generated.
Inbound data waiting to be transmitted.
Outbound data in process.
Outbound data to be processed.
Local copy data to be sent to a printer.
Available (free) space in the buffer.

SIZE indicates the number of bytes of space associated with the corresponding TYPE, and LOCATION indicates the address of the first byte of the space.

Although shown as located in the local storage of the controller 8, the information table 150 may be in the buffer 100 at the device.

Referring now to FIG. 6, in line (a) it is assumed that the host generates an "outbound message A" for the device. This data is intercepted by the controller 8 which, using table 150, allocates a space for such data in the buffer 100, which is here assumed to be at location #1. Next, line (b), the controller writes the outbound message A to location #1 in the buffer 100. This is followed by a command, line (c), which is inserted in the buffer 100 for instructing the microprocessor 104 to process $n_1$ bytes of data (=outbound message A) at location #1.

Now it is assumed that the host 26 issues a second message, "outbound message B", shown at line (d), and this is handled at line (e) in the same way as the first message A, except that the allocated space is now at location #2, and the message is assumed to consist of $n_2$ bytes.

At this point, and before the controller 8 issues a command similar to that at line (c) to process outbound message B, it is assumed that the device 58 wishes to transmit data ("inbound message C") to the host, whereby the microprocessor 104 loads a corresponding request code into a small part of the buffer 100 reserved for that purpose. The device 58 is continually polled by the controller 8 between data traffic, and on the next poll the request code is examined so that the availability of inbound message C is signalled back to the controller 8, line (f). This is acknowledged by the controller 8, line (g), but at this stage the actual inbound message C is not written into the buffer 100.

Next it is assumed that the process instructed by the command at line (c) is completed, so that microprocessor loads a completion code into the buffer 100 at a pre-defined location. On the next poll, the completion code is examined and the fact of completion is signalled back to the controller, line (h).

Now the controller has two options; either to pass a command to process the $n_2$ bytes of outbound message B at location #2, line (i), or to instruct the device microprocessor to write its available inbound message C (assumed to consist of $n_3$ bytes) in the buffer 100 at location #3 for subsequent transmission to the controller 8, line (j). The particular option chosen will depend upon the current state of the buffer 100, the available buffering in the controller 8, and general traffic conditions between the host and controller.

It will be noted that (at least during normal operations as above) the controller 8 at all times retains the exclusive right to determine when data passes on the coaxial line 50 in either direction. This is absolutely necessary as the device 58 does not know the current conditions pertaining to the controller 8 and any unsolicited transmission of data from the device buffer 100 to the controller 8 cannot therefore be allowed.

FIG. 7 is a showing, in greater detail, of portions of the logic at the coax interface section suitable for embodiment of features of a device of the kind shown at 58 in FIG. 4. In FIG. 7.1, the coaxial cable is indicated at 50 as being connected to a driver/receiver module 200 (FIG. 7.2) which, through the agency of a line control module 202 receives serial data from the coax 50 and delivers it via 204 to a serial/deserializer or serdes 206 from which the deserialized outbound data (outbound in the sense of coming out from the host and controller) is delivered via a bus 208 to a transfer register 210. Inbound data is delivered via a bus 212 to a byte buffer 214 and then via 216 to serdes 206, in serial form via 218 to the LCM 202 and thence via 200 to the coax 50 for transmission to the controller 8. In the showing of FIG. 7.1 the input/output buffer memory is shown at 100 as a portion of the memory 102 of the device 58.

When the controller 8 wishes to communicate with its buffer 100 in the device of FIG. 7, it transmits a command via 50 along the outbound path 200, 202, 204, 206, 208, 210 above described and thence via 220 to a command decoder 222 so as to direct the following data to storage via 210 and 224 and data bus 226 at the addresses in input/output buffer 100 directed by the controller via address bus 228.

The controller 8 can then send a command via 50 in the aforedescribed route to the command decoder 222 requiring the microprocessor 104 and associated system logic 230 to fetch the data stored by the controller 8 in input/output buffer 100 from that buffer and process it. That data may itself contain a command.

When the device 58 has data or other information for transmission to the controller 8, it can, under the control of its own program place an attention signal in a predefined section of input/output buffer 100. The controller 8 polls all devices at frequent intervals, and in response to such a poll, the device 58 will place the attention signal which it has stored in input/output memory 100 on the inbound path to the controller 8. Thereupon the controller can issue another command directing the device to place the message (data or otherwise) which it wishes to send to the controller into a particular location in input/output memory 100 specified at that time by controller 8. Thereafter controller 8 can issue a read command to that location in buffer 100 whereby the transmission desired by the device 58 to controller 8 is effected via busses 226 and 212, buffer 214, serdes 206, line 218 driver 200 and coax 50.

As aforesaid the invention makes it unnecessary for the controller 8 to provide storage within itself for the bulk of the data transmitted to and from the device 58. It need only keep a record of where it has put the data and what locations it has required the device to store data in for transmission. Moreover, there is no need for the controller 8 to interpret the data other than attention signals and the like coming from the device 58 or destined for it. Depending on the storage capacity of the controller 8 the so-called bookkeeping entries for the management of input/output memory 100 can be stored in the controller 8 or could even be stored in the input/output buffer 100 itself with only an abbreviated pointer set in the controller 8 memory for accessing that information.

The present invention is especially useful in systems wherein when data stream processing is moved from the control unit to the device to allow more capabilities in the data stream; the device is less sensitive to the nature of the communications link because most of its operations are internal to itself. At the same time it has no knowledge of the controller units buffering and thruput requirements. This makes any pre-allocation of transmission link buffering optimal for only a subset of the operational environments.

What has been disclosed is a transmission link management system wherein a coax buffer is owned and allocated by the control unit for data traversing in both directions. The control unit places data at any point in the buffer and tells the device to process it. The device signals asynchronous completion. If the controller needs to offload data while the device is processing, the control unit may write the data to another point in the buffer allowing full overlap. If the device wishes to send a message, the device signals the control unit. The control unit, at its leisure, tells the device where in the buffer to build the data, the maximum amount of data that may be built and tells the device to start building the data. The device signals the controller when the data is built. The controller can read data from the buffer or write data to the buffer while the device is processing. The controller is thus able to tune the use of the buffer to the specific environment in which the controller is operating.

We claim:

1. In a display data terminal system including a controller and an input/output device, such as a keyboard-display, connected to said controller by a transmission link, the improvement wherein the said device includes an input/output byte addressable buffer in communication with said transmission link, said buffer comprising storage for blocks of data and command information with respect thereto, and said device further comprising control logic responsive to said commands to direct said device to process outbound data stored in said buffer by said controller and to store inbound data for later processing, all under the direction of the said controller;
wherein the said controller places data at any address in the said buffer and directs the device to process it, and upon completion of the required specified operation, said device signals said controller;
and wherein the said controller can off-load data, received from the host computer, to the said byte addressable buffer while the said device is processing data, allowing full overlap operation, between the controller off-loading data and the device processing data.

2. The improvement, according to claim 1, wherein means are provided whereby if said device wishes to send a message comprising inbound data to said controller, said device signals said controller, and said controller sends commands to
said device telling said device the address in said device buffer to build a block of data to be transmitted, the maximum amount of data that may be built and to start building said block of data, and wherein said device signals said controller when the building of said data block in its buffer is completed whereby said controller can read the data from said buffer or write data in said buffer while said device is processing.

said controller being adapted to manage the use of said device buffer in accordance with the requirements of said data terminal system in which said controller is operating.

3. The improvement according to claim 1 or claim 2, wherein means are provided whereby if said device wishes to send inbound data to said controller, it signals the said controller, and the said controller sends commands to said device identifying the address in said device buffer to build the block of data to be transmitted, the maximum amount of data that may be built and then direct said device to start building said block of data, said device signalling said controller when said data block has been built in its buffer whereby said controller can read data from said buffer or write data in said buffer while the said device is processing, said controller being adapted to manage the use of the device buffer in accordance with the specific requirements of the system in which the said controller is operating.

* * * * *